(12) United States Patent
Zhang (10) Patent No.: US 11,478,699 B2
(45) Date of Patent: Oct. 25, 2022

(54) VR GLASSES ACCESSORY AND VR GLASSES ASSEMBLY

(71) Applicant: SHENZHEN HONGJIANTOU TECHNOLOGY CO., LTD, Shenzhen (CN)

(72) Inventor: Zhinan Zhang, Shenzhen (CN)

(73) Assignee: SHENZHEN HONGJIANTOU TECHNOLOGY CO., LTD, Shenzhen (CN)

(*) Notice: Subject to any disclaimer, the term of this patent is extended or adjusted under 35 U.S.C. 154(b) by 0 days.

(21) Appl. No.: 17/215,170

(22) Filed: Mar. 29, 2021

(65) Prior Publication Data
US 2022/0266131 A1    Aug. 25, 2022

(30) Foreign Application Priority Data
Feb. 19, 2021    (CN) .......................... 202120378406.9

(51) Int. Cl.
*G02B 27/01*  (2006.01)
*A63F 13/98*  (2014.01)
(Continued)

(52) U.S. Cl.
CPC .............. *A63F 13/26* (2014.09); *A63F 13/90* (2014.09); *A63F 13/98* (2014.09); *A63F 2300/8082* (2013.01); *G02B 27/0176* (2013.01)

(58) Field of Classification Search
CPC ................ A63F 13/26; A63F 2300/301; A63F 2300/8082; G02B 2027/0178; G02B 27/0172; G02B 27/0176
See application file for complete search history.

(56) References Cited

U.S. PATENT DOCUMENTS 2,435,653 A * 2/1948 Maurer .................... A61F 9/028
128/201.15
3,298,031 A * 1/1967 Harold ............... A41D 13/1184
2/9
(Continued)

FOREIGN PATENT DOCUMENTS

EP            2965728 A1 * 1/2016 ............. A61F 9/025
WO    WO-2018219238 A1 * 12/2018 ......... G02B 27/0176

OTHER PUBLICATIONS

English machine translation of WO 2018219238A1 to Long Shoulun. Source: https://patents.google.com/patent/WO2018219238A1/en?oq=PCT%2fCN2018%2f088576 Retrieved Dec. 7, 2021 (Year: 2021).*

(Continued)

*Primary Examiner* — Steven J Hylinski
(74) *Attorney, Agent, or Firm* — Westbridge IP LLC (57) ABSTRACT

The present application discloses a VR glasses accessory and a VR glasses assembly. The VR glasses accessory is applied for VR glasses, and the VR glasses have a facing side facing a user's face. The VR glasses accessory includes a main body, a connector and a nose cover. The main body is configured to be arranged on an edge of the facing side and abut against the user's face. The connector is configured to connect the main body to the VR glasses, and the nose cover is arranged on the main body at a position corresponding to the user's nose, to shade at the user's nose. The present application solves a problem that current VR glasses have poor shading effect, resulting in poor gaming experience obtained by VR game players when wearing VR glasses games.

10 Claims, 5 Drawing Sheets

(51) Int. Cl.
*A63F 13/26* (2014.01)
*A63F 13/90* (2014.01)

(56) References Cited

U.S. PATENT DOCUMENTS

| | | | | |
|---|---|---|---|---|
| 3,591,864 A | * | 7/1971 | Allsop | A61F 9/028 2/436 |
| 3,708,224 A | * | 1/1973 | Lindblom | A61F 9/028 351/62 |
| 3,945,044 A | * | 3/1976 | McGee | A61F 9/025 2/436 |
| 4,011,595 A | * | 3/1977 | Shields | A61F 9/028 2/436 |
| 4,317,240 A | * | 3/1982 | Angerman | A61F 9/025 2/436 |
| 4,425,669 A | * | 1/1984 | Grendol | A61F 9/028 2/436 |
| 4,653,124 A | * | 3/1987 | McNeal | A61F 9/029 128/206.21 |
| D347,016 S | * | 5/1994 | Bolle' | D16/314 |
| 9,795,513 B2 | * | 10/2017 | Padovani | A61F 9/025 |
| 2013/0014316 A1 | * | 1/2013 | Castro | A41D 13/1184 2/424 |

OTHER PUBLICATIONS

"For Oculus Quest 2 VR Headset Anti-leakage Light Nose Cover Cushion Soft Silicone Light Blocking Barrier Nose Pad VR Accessories," published Dec. 18, 2020. Source: https://www.aliexpress.com/item/1005001874497895.html (Year: 2020).*

"New VR Cover Accessories for Meta/Oculus™ Quest 2 Combat Sweat, Fogging and Light Leaks," published Sep. 16, 2020. Source: https://vrcover.com/new-vr-cover-accessories-for-oculus-quest-2-combat-sweat-fogging-and-light-leaks/ (Year: 2020).*

"AMVR vs VR Cover—AMVR Facial Interface Kit for Oculus Quest 2—Install & Review," by Oculus Quest Play, published Jan. 26, 2021. Source: youtube.com/watch?v=RxN5vFPYvqc (Year: 2021).*

* cited by examiner

VR GLASSES ACCESSORY AND VR GLASSES ASSEMBLY

CROSS REFERENCE TO RELATED APPLICATIONS

The present application claims the priority to Chinese Patent Application No. 202120378406.9 filed on Feb. 19, 2021, the entire contents of which are incorporated herein by reference.

TECHNICAL FIELD

The present application relates to the technical field of VR (Virtual Reality) glasses, in particular to a VR glasses accessory and a VR glasses assembly.

BACKGROUND

A pair of VR glasses (Virtual Reality Head-Mounted Display Device) is a device that closes the user's vision and hearing to the outside world and guides the user to produce a feeling of being in a virtual environment. Current VR glasses usually have a problem of poor shading effect, which leads to a poor gaming experience for VR gamers when playing VR glasses games.

SUMMARY

The main purpose of the present application is to propose a VR glasses accessory, which aims to solve a problem that current VR glasses have poor shading effect, which leads to a poor gaming experience that VR game players get when playing VR glasses games.

In order to achieve the above purpose, the VR glasses accessory proposed by the present application is applied for a pair of VR glasses. The VR glasses have a facing side facing a user's face, the VR glasses accessory includes:

a main body, configured for being arranged at an edge of the facing side and abutting against the user's face;

a connector, configured for connecting the main body to the VR glasses; and a nose cover, arranged at a position corresponding to the user's nose on the main body, to block light at the user's nose.

In one embodiment, a material of the nose cover is an elastic material to fit with the user's nose.

In one embodiment, the nose cover is detachably connected to the main body.

In one embodiment, one of the main body and the nose cover is provided with a protrusion, and the other one is provided with a hole, the protrusion is engageable with the hole to connect the nose cover with the main body.

In one embodiment, a side of the main body facing the user's face is provided with a ventilation pad, and the ventilation pad is configured to abut against the user's face.

In one embodiment, the main body is provided with a ventilation channel, the ventilation channel is configured for ventilating when the main body abuts against the user's face, and the ventilation channel is provided with a shading structure.

In one embodiment, the VR glasses, the main body and the user's face form a shading space; the shading structure includes at least two shading surfaces extending in different directions in the ventilation channel, to block light beams propagating to the ventilation channel in different directions from outside the shading space.

In one embodiment, the VR glasses accessory further includes a dust cover, and the dust cover is configured to cover the VR glasses.

In one embodiment, the VR glasses are provided with a first buckle structure, the connector includes a second buckle structure arranged on the main body, and the second buckle structure is clamped by the first buckle structure.

The application also proposes a VR glasses assembly, including VR glasses and the VR glasses accessory as described above, the VR glasses have a facing side facing the user's face, the VR glasses accessory is connected to the facing side.

The technical schemes of the present application provides a connector to connect a main body of an accessory to an edge of a pair of VR glasses on a facing side of the VR glasses, so as to abut against a user's face, and arranges a nose cover on the main body corresponding to the user's nose, and uses the nose cover to shade at the user's nose, so as to solve the problem that a pair of current VR glasses have poor shading effect, leading to a poor gaming experience that VR gamers get when playing VR glasses games.

BRIEF DESCRIPTION OF THE DRAWINGS

In order to more clearly illustrate the embodiments of the present application or the technical solutions in the related art, the following will briefly introduce the drawings that need to be used in the description of the embodiments or the related art. Obviously, the drawings in the following description are only some embodiments of the present application, for ordinary technicians in the art, without creative labor, other drawings can also be obtained according to the structure shown in these drawings.

The realization, functional characteristics and advantages of the purpose of the present application will be further described with reference to the drawings in combination with the embodiments.

DETAILED DESCRIPTION OF THE EMBODIMENTS

The following will be combined with the drawings in the embodiment of the present application, the technical scheme in the embodiment of the present application is clearly and completely described. Obviously, the described embodiments are only a part and not all of the embodiments of the present application. Based on the embodiments in the present application, all other embodiments obtained by ordinary technicians in the art without making creative labor belong to the claimed scope of the present application.

It should be noted that, if the embodiment of the present application involves directional indications (such as up, down, left, right, front, back . . . ), the directional indication is only used to explain the relative position relationship, movement, etc. between components under a specific posture (as shown in the figure), if the specific posture changes, the directional indication changes accordingly.

In addition, if there is a description relating to "first", "second" and the like in the embodiment of the present application, the description of "first", "second" and the like is only used for description purposes, it cannot be understood as indicating or implying its relative importance or implicitly indicating the number of technical features indicated. Therefore, the features defined with "first" and "second" may explicitly or implicitly include at least one of the features. In addition, the meaning of "and/or" in the full text is to include three parallel schemes, taking "A and/or B" as an example, including scheme A, or scheme B, or both scheme A and B. In addition, the technical solutions between the various embodiments can be combined with each other, but must be based on the implementation of ordinary technicians in the art. When the combination of technical solutions contradicts each other or cannot be realized, it should be considered that the combination of such technical solutions does not exist and is not within the scope of protection required by the present application.

The present application provides a VR glasses accessory, which is used for a pair of VR glasses. The VR glasses have a facing side facing a user's face.

Figure 1:
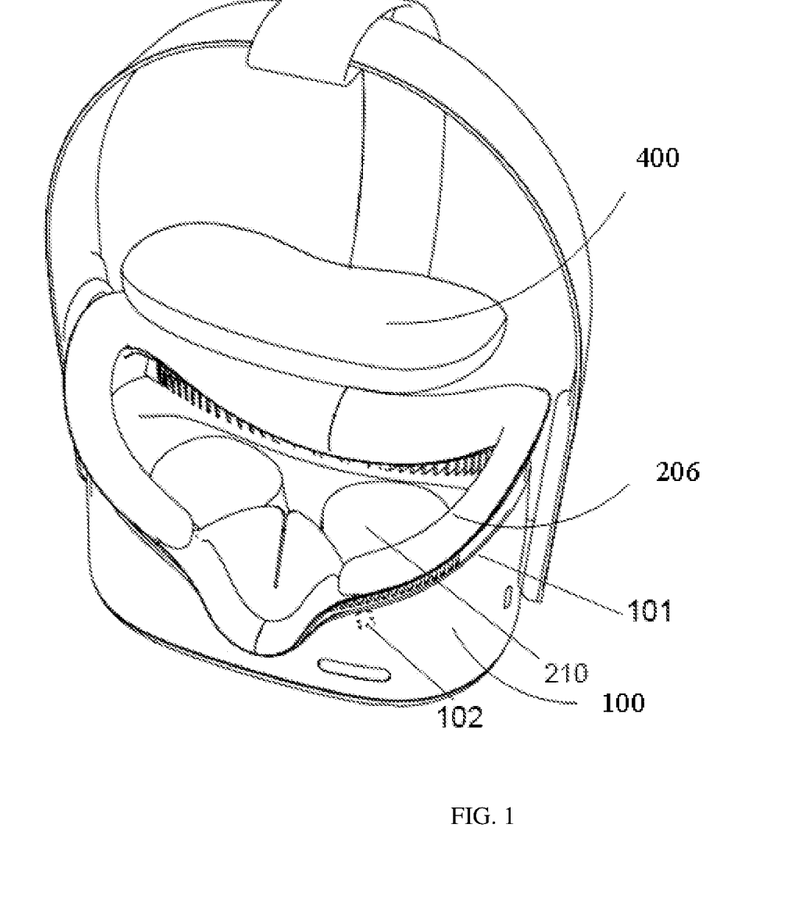
FIG. 1 is a schematic structural diagram of an embodiment of a VR glasses assembly of the present application.
Figure 2:
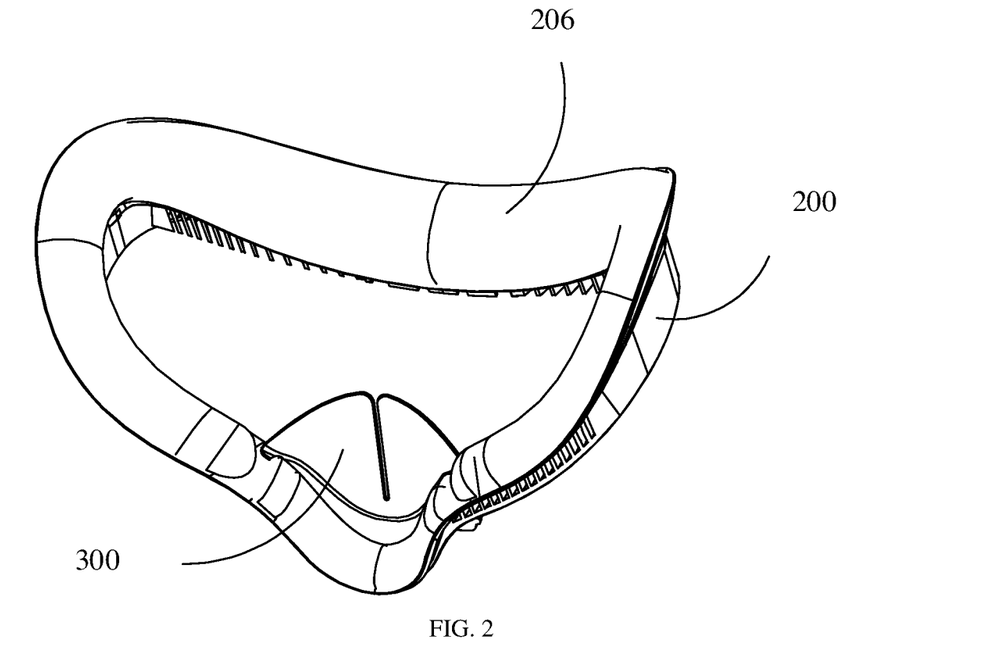
FIG. 2 is a schematic structural diagram of an embodiment of a VR glasses accessory of the present application.

According to FIG. 1 and FIG. 2, in an embodiment of the present application, a VR glasses accessory 1000 includes a main body 200, a connector 215, and a nose cover 300. The main body 200 is arranged at an edge of the facing side and is configured to abut against the user's face. The connector 215 is configured to connect the main body 200 to the VR glasses 100. The nose cover 300 is arranged at a position corresponding to the user's nose on the main body 200 to shade the user's nose. It can be understood that in the present embodiment, a shape of a side of the main body 200 connected to the VR glasses 100 is adapted to a shape of the VR glasses 100.

The technical scheme of the present application provides the connector 215 to connect the main body 200 to the edge of the facing side of the VR glasses 100, so as to abut against the user's face, and set the nose cover 300 at a position corresponding to the user's nose on the main body 200, and arrange the nose cover 300 to shade the user's nose to reduce ambient light and solve the problem that current VR glasses 100 have poor shading effect, leading to the problem that VR game players get poor gaming experience when wearing VR glasses 100 in the games.

In an embodiment, a material of the nose cover 300 is an elastic material, such as silicone material. Through characteristics of elasticity and good ventilation of the silicone material, after the user wears the VR glasses 100, the nose cover 300 fits well with the user's nose, ensuring good shading effect and good ventilation effect. At the same time, the nose cover 300 has better pressure on the user's nose and makes the user more comfortable to wear. Furthermore, the nose cover 300 adapts to noses with different sizes and heights.

In some embodiments, in order to make the nose cover 300 suitable for different users, a thickness of the nose cover 300 is set to be 0.4 mm to 0.6 mm, for example, in one embodiment, the thickness of the nose cover 300 is set to be 0.5 mm, making the nose cover 300 light, thin, ventilating and comfortable to wear.

In an embodiment, the nose cover 300 is arranged in a curved shape to better adapt to the shape of the nose of a human body and reduce the pressure on the nose of the user during wearing.

In an embodiment, the nose cover 300 is detachably connected to the main body 200. By detachably connecting the nose cover 300 with the main body 200, the nose cover 300 can be disassembled and replaceable, so that a new nose cover 300 can replace the nose cover 300 after the nose cover 300 is damaged or dirty to avoid frequent replacement of the entire VR glasses accessory 1000, therefore reducing a usage cost.

Figure 3:
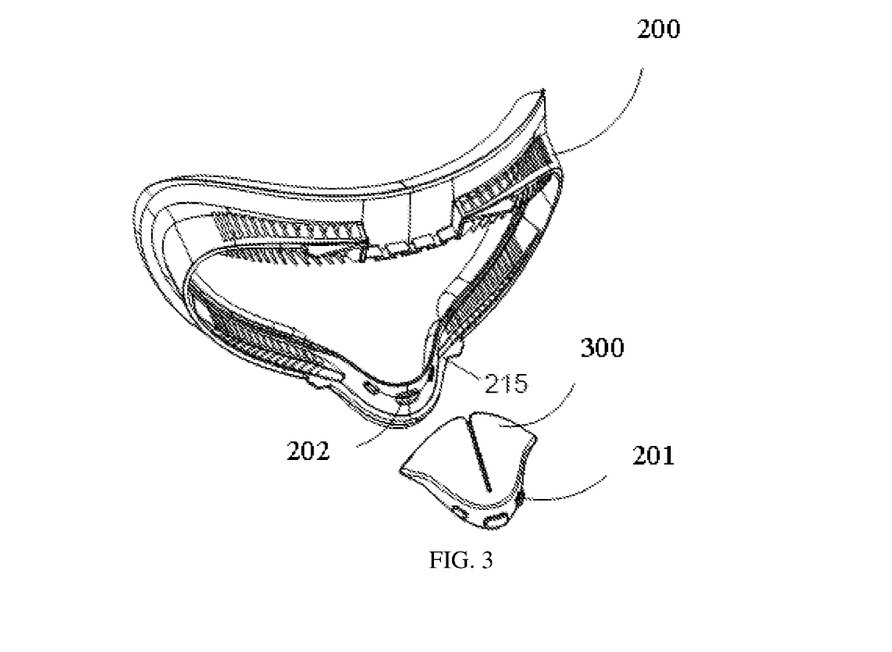
FIG. 3 is a detailed view of a main body and a nose cover of the VR glasses accessory in FIG. 2.
Figure 4:
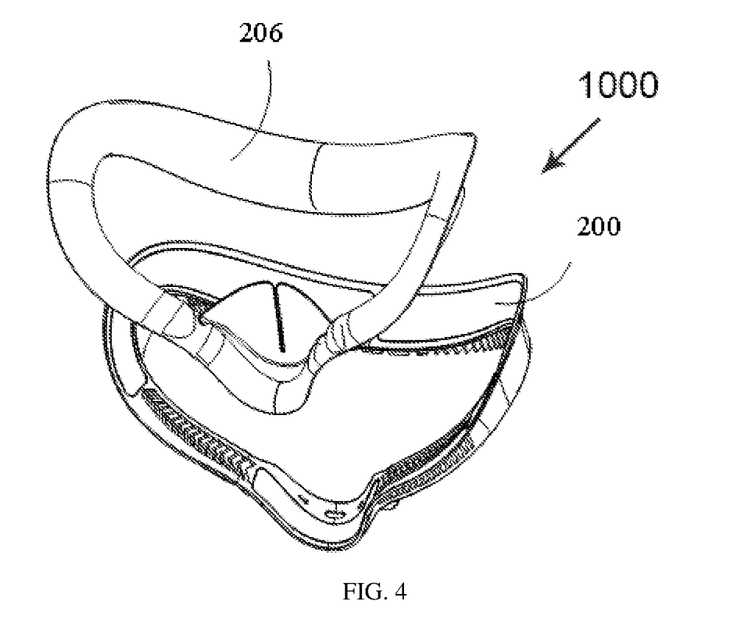
FIG. 4 is an exploded view of the VR glasses accessory in FIG. 2.

According to FIG. 2 and FIG. 3, in an embodiment, one of the main body 200 and the nose cover 300 is provided with a protrusion 201, and the other one is provided with a hole 202. The protrusion 201 is engaged with the hole 202. By setting the protrusion 201 on one of the main body 200 and the nose cover 300, and defining the hole 202 on the other, a clamping and fixing between the nose cover 300 and the main body 200 are realized by using a clamping connection between the protrusion 201 and the hole 202, which is convenient to be operated.

In an embodiment, the nose cover 300 is a left-right symmetrical structure, there are multiple pairs of protrusions 201 and the holes 202. The multiple pairs of protrusion 201 and holes 202 are distributed at an edge of the nose cover 300. Therefore, the nose cover 300 is more stably connected to the main body 200, and the using experience of a user is prevented from being affected by that the nose cover 300 is separated from the main body 200 during usage.

In an embodiment, there are three pairs of protrusions 201 and the holes 202, one pair of which the protrusion 201 and the hole 202 are arranged on an axis of symmetry of the nose cover 300, the other two pairs of protrusions 201 and holes 202 are arranged on both sides of the axis of symmetry of the nose cover 300, so that connection stress points between the nose cover 300 and the main body 200 are more evenly distributed. In turn, a nasal force is more uniform during wearing, so that the user can wear it more comfortably.

Figure 5:
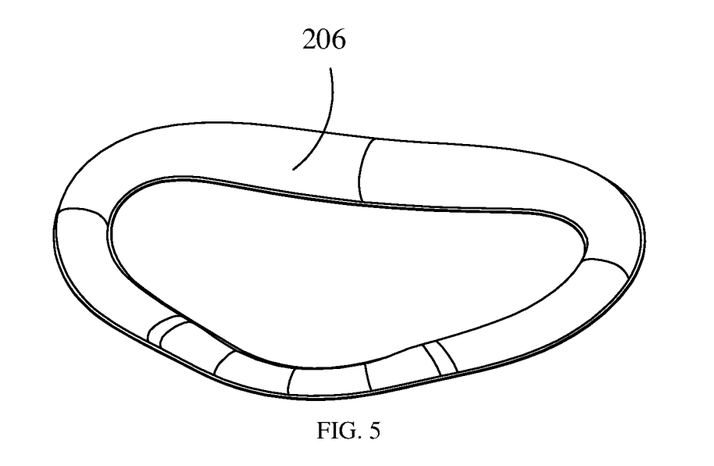
FIG. 5 is a schematic structural diagram of a ventilation pad of the VR glasses accessory in FIG. 4.
Figure 6:
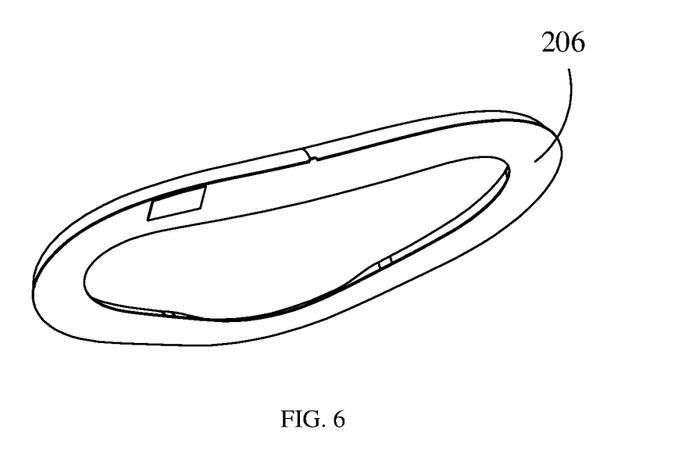
FIG. 6 is a schematic structural diagram of another view of the ventilation pad in FIG. 5.

According to FIG. 2, FIG. 5 and FIG. 6, in an embodiment, the main body 200 has a ventilation pad 206 on a side facing the user's face, and the ventilation pad 206 is configured to abut against the user's face. By setting a ventilation pad 206 on a side of the main body 200 facing the user's face, where the ventilation pad 206 is configured to abut against the user's face, the user can wear more comfortably and breathe more freely.

In an embodiment, one of the main body 200 and the ventilation pad 206 is provided with a magic tape suede surface, the other is provided with a magic tape hook surface, and the ventilation pad 206 is connected and fixed on the main body 200 by a magic tape. The operation is convenient, and the pressure on the user's face during wearing is small. Specifically, the side of the main body 200 facing the user's face is provided with a groove, and the magic tape suede or hook surface is fixed in the groove by adhesive, so as to ensure that the ventilation pad 206 is more smoothly attached to the main body 200. A surface of the ventilation pad 206 is provided with a protein skin, wrapping a memory sponge, and the surface of the ventilation pad 206 is provided with micropores. It can be understood that the memory sponge is a polyurethane sponge with slow rebound characteristics. Filling the interior of the ventilation pad 206 with memory sponge makes it more comfortable, ventilating and stain resistant to wear. In an embodiment, an identification portion is further provided on the main body of the pad, so as to facilitate identification. For example, a logo piece made of pvc material can be set in the identification portion, which not only plays a role in identification, but also bring no inconvenience to users.

Figure 7:
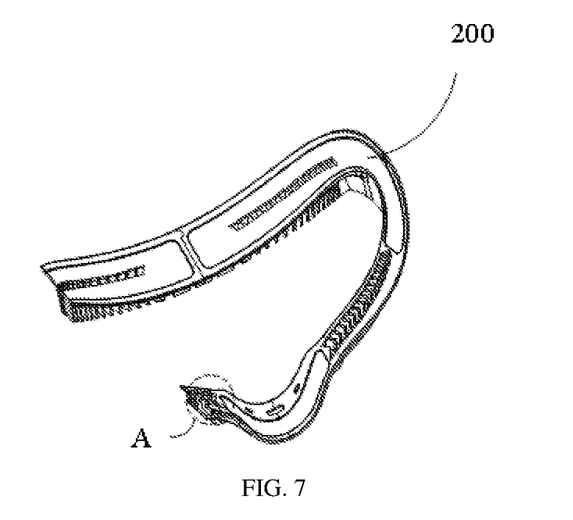
FIG. 7 is a schematic diagram of structure of a cross-sectional structure of the main body in FIG. 3.
Figure 8:
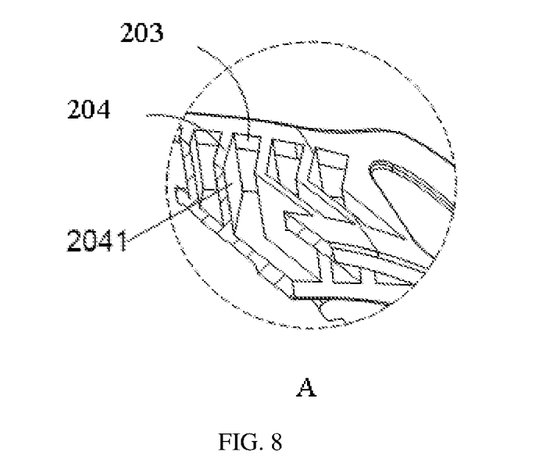
FIG. 8 is a partial enlarged view of portion A in FIG. 7.

According to FIG. 7 and FIG. 8, in an embodiment, the main body 200 is provided with a ventilation channel 203, and the ventilation channel 203 is configured for ventilation when the main body 200 abuts against the user's face, the ventilation channel 203 is provided with a light shading structure 204. By setting a ventilation channel 203 on the main body 200, when the user wears the VR glasses 100, a relatively sealed space formed among the VR glasses 100, the main body 200 and the user's face is configured to ventilate through the ventilation channel 203 with an external environment, avoiding a sultry experience, and at the same time achieving a good shading effect, reducing ambient light.

In an embodiment, the VR glasses 100, the main body 200 and the user's face form a shading space 210. A shading structure 204 includes at least two shading surfaces 2041 extending in different directions in the ventilation channel 203, in order to block the light beams propagating from different directions outside the shading space 210 to the ventilation channel 203. By setting at least two shading surfaces 2041 extending in different directions in the ventilation channel 203, the shading surfaces 2041 extending along different directions block the light beams propagating from different directions outside the shading space 210 to the ventilation channel 203, therefore achieving a good shading effect. In one embodiment, the main body 200 is made of plastic material, thereby increasing the internal space to effectively alleviate the sultry experience.

In an embodiment, the ventilation channel 203 extends along the edge of the facing side of the VR glasses 100, and a plurality of shading baffles are provided at intervals in an extending direction of the ventilation channel 203. It can be understood that although the light beams will be reflected on each light shading baffle, in this embodiment, the plurality of light shading baffles are arranged at intervals in an extension direction of the ventilation channel 203, extending the propagation path of light beams, so that the brightness of the light beams that eventually propagates to the shading space 210 is very low, which has little impact on the user's experience.

In some embodiments, the shading baffle is in a shape of a mansard line or curve, so as to form a plurality of shading surfaces 2041 on a same shading baffle. The plurality of shading baffles are arranged at intervals in the extension direction of the ventilation channel 203, the light propagating from different directions outside the shading space 210 to the ventilation channel 203 is reflected many times between multiple shading surfaces 2041 on a same shading baffle and between the shading surfaces 2041 of different shading baffles, brightness of the light that eventually propagates into the shading space 210 is further reduced and the shading effect is improved.

According to FIG. 1, in an embodiment, the VR glasses accessory 1000 further includes a dust cover 400, and the dust cover 400 is configured to cover the VR glasses 100. By setting the dust cover 400, when the user does not use the VR glasses 100, the dust cover 400 is used to cover the VR glasses 100, so as to play a dust-proof role and prevent the VR glasses 100 from being damaged.

In an embodiment, the dust cover 400 is a high-density sponge wrapped in Lycra fabric, which is light and soft. When the user does not wear the VR glasses 100 to play games, the dust cover 400 covers the VR glasses 100, which is dust-proof without damaging the VR glasses 100.

Figure 9:
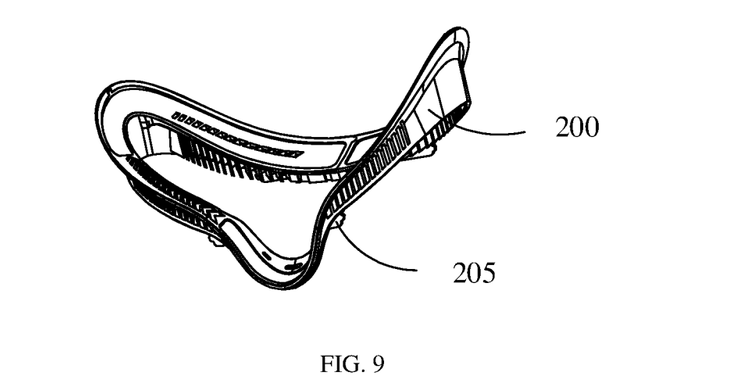
FIG. 9 is a schematic structural diagram of the main body of the VR glasses accessory in FIG. 2.

According to FIG. 9, in an embodiment, the VR glasses 100 is provided with a first buckle structure 102, and the connector 215 includes a second buckle structure 205 arranged on the main body 200, the second buckle structure 205 is engaged with the first buckle structure. By the engagement of the second buckle structure 205 on the main body 200 and the first buckle structure on the VR glasses 100, the connection between the main body 200 and the VR glasses 100 is realized, and the operation is convenient. The specific forms of the first buckle structure and the second buckle structure 205 are not limited, and references may be made to the buckle structure in the related arts, which is not described here again.

According to FIG. 1, the present application also proposes a VR glasses assembly. The VR glasses assembly includes a pair of VR glasses 100 and a VR glasses accessory 1000. A specific structure of the VR glasses accessory 1000 refers to the above embodiments. Since the VR glasses assembly adopts all the technical solutions of the above-mentioned embodiments, the VR glasses assembly has at least all the beneficial effects brought by the technical solutions of the above-mentioned embodiments, which will not be repeated here. In particular, the VR glasses 100 has a facing side 101 facing a user's face, and the VR glasses accessory 1000 is connected to the facing side.

The above are only optional embodiments of the present application, and therefore do not limit the patent scope of the present application, under the concept of the present application, the equivalent structural transformations made by the description of the present application and the contents of the drawings, or the direct/indirect applications in other related technical fields are included in the claimed scope of the present application.

The invention claimed is:

1. A VR glasses accessory for a pair of VR glasses, the VR glasses having a facing side facing a user's face, wherein the VR glasses accessory comprises:
   a main body, configured for being arranged at an edge of the facing side and abutting against the user's face;
   a connector, configured for connecting the main body to the VR glasses; and
   a nose cover, arranged at a position corresponding to the user's nose on the main body, to shade the user's nose and block light beams at the user's nose; wherein,
   the nose cover is arranged in a curved shape;
   the nose cover is detachably connected to the main body and is disassemblable and replaceable, and configured to directly touch a top surface of the user's nose; and
   a material of the nose cover is a silicone material and fitted with the user's nose;
   wherein the main body is provided with four ventilation channels, the four ventilation channels are distributed at three sides of the main body, the ventilation channel is configured for ventilating when the main body abuts against the user's face, and a plurality of shading baffles are provided along an extension direction of the ventilation channel and each shading baffle has a folded shape or a curved shape;
   the main body is configured for forming a shading space with the VR glasses and the user's face;
   each shading baffle comprises at least two shading surfaces extending in different directions in the ventilation channel, to block light beams propagating to the ventilation channel in different directions from outside the shading space.

2. The VR glasses accessory according to claim 1, wherein one of the main body and the nose cover is provided with a protrusion, and the other one is provided with a hole, the protrusion is engageable with the hole to connect the nose cover with the main body; wherein, there are three pairs of protrusions and holes with one pair being arranged on an axis of symmetry of the nose cover, and the other two pairs being arranged on both sides of the axis of symmetry of the nose cover, the protrusions are engaged with the holes to detachably connect the nose cover with the main body.

3. The VR glasses accessory according to claim 1, wherein a side of the main body facing the user's face is provided with a ventilation pad, and the ventilation pad is configured for abutting against the user's face.

4. The VR glasses accessory according to claim 1, further comprising a dust cover configured for covering the VR glasses.

5. The VR glasses accessory according to claim 1, wherein the connector comprises a second buckle structure arranged on the main body, and the second buckle structure is engageable with a first buckle structure formed on the VR glasses to clamp the VR glasses accessory to the VR glasses.

6. A VR glasses assembly, comprising a pair of VR glasses and a VR glasses accessory, the VR glasses being configured with a facing side facing a user's face, and the VR glasses accessory being connected to the facing side, wherein the VR glasses accessory comprises:

a main body, arranged at an edge of the facing side and configured for abutting against the user's face;

a connector, configured for connecting the main body to the VR glasses; and a nose cover, arranged at a position corresponding to the user's nose on the main body, to block light beams at the user's nose; wherein, the nose cover is arranged in a curved shape;

the nose cover is detachably connected to the main body and is disassemblable and replaceable, and configured to directly touch a top surface of the user's nose; and a material of the nose cover is a silicone material to fit with the user's nose;

wherein the main body is provided with four ventilation channels, the four ventilation channels are distributed at three sides of the main body, the ventilation channel is configured for ventilating when the main body abuts against the user's face, and a plurality of shading baffles are provided along an extension direction of the ventilation channel and each shading baffle has a folded shape or a curved shape;

the main body is configured for forming a shading space with the VR glasses and the user's face;

each shading baffle comprises at least two shading surfaces extending in different directions in the ventilation channel, to block light beams propagating to the ventilation channel in different directions from outside the shading space.

7. The VR glasses assembly according to claim 6, wherein one of the main body and the nose cover is provided with a protrusion, and the other one is provided with a hole, the protrusion is engageable with the hole to connect the nose cover with the main body;

wherein, there are three pairs of protrusions and holes with one pair being arranged on an axis of symmetry of the nose cover, and the other two pairs being arranged on both sides of the axis of symmetry of the nose cover, the protrusions are engaged with the holes to detachably connect the nose cover with the main body.

8. The VR glasses assembly according to claim 6, wherein a side of the main body facing the user's face is provided with a ventilation pad, and the ventilation pad is configured for abutting against the user's face.

9. The VR glasses assembly according to claim 6, wherein the VR glasses accessory further comprises a dust cover configured for covering the VR glasses.

10. The VR glasses assembly according to claim 6, wherein the connector comprises a second buckle structure arranged on the main body, and the second buckle structure is engageable with a first buckle structure formed on the VR glasses to clamp the VR glasses accessory to the VR glasses.

\* \* \* \* \*